United States Patent [19]

Hollmann

[11] 4,283,241

[45] Aug. 11, 1981

[54] METHOD OF PRODUCING A TIRE FOR A PNEUMATIC TIRE ARRANGEMENT

[75] Inventor: Josef G. Hollmann, Munich, Fed. Rep. of Germany

[73] Assignee: Hischmann Technik AG, Zürich, Switzerland

[21] Appl. No.: 48,738

[22] Filed: Jun. 15, 1979

Related U.S. Application Data

[63] Continuation-in-part of Ser. No. 853,172, Nov. 21, 1977, abandoned.

[30] Foreign Application Priority Data

Nov. 22, 1976 [DE] Fed. Rep. of Germany ....... 2653022

[51] Int. Cl.³ .................... B29H 17/00; B29H 17/26
[52] U.S. Cl. ................ 156/117; 156/123 R; 156/126; 156/133; 156/397
[58] Field of Search .......... 156/110 R, 123, 124, 156/126–130, 132, 131, 133, 394, 397, 398, 401–403, 408–421, 117, 166, 172, 173, 176, 177, 180, 433, 434

[56] References Cited

U.S. PATENT DOCUMENTS

| | | | |
|---|---|---|---|
| 2,401,045 | 5/1946 | Brickman | 156/127 |
| 2,407,152 | 9/1946 | Haase | 156/127 |
| 2,692,005 | 10/1954 | DeCloud | 156/131 |
| 2,982,327 | 5/1961 | Vanzo | 152/361 |
| 3,183,135 | 5/1965 | Berquist | 156/126 |
| 3,223,573 | 12/1965 | Deist | 156/130 |
| 3,486,962 | 12/1969 | Gallagher | 156/441 |
| 3,717,529 | 2/1973 | Rattray et al. | 156/130 |
| 3,837,967 | 9/1974 | Symons | 156/130 |
| 3,881,974 | 5/1975 | deZarauz | 156/124 |
| 3,915,788 | 10/1975 | Hirata et al. | 156/126 |
| 4,028,164 | 6/1977 | Montagut | 156/173 |
| 4,126,720 | 11/1978 | Edwards | 156/117 X |

FOREIGN PATENT DOCUMENTS

| | | |
|---|---|---|
| 1016434 | 9/1957 | Fed. Rep. of Germany . |
| 1277558 | 9/1968 | Fed. Rep. of Germany . |
| 1579327 | 7/1969 | Fed. Rep. of Germany . |
| 1808351 | 5/1970 | Fed. Rep. of Germany . |
| 1810763 | 6/1970 | Fed. Rep. of Germany . |
| 2018930 | 11/1970 | Fed. Rep. of Germany . |
| 2432199 | 1/1976 | Fed. Rep. of Germany . |
| 820825 | 9/1959 | United Kingdom . |
| 1232211 | 5/1971 | United Kingdom . |

*Primary Examiner*—John E. Kittle

[57] ABSTRACT

Carcass plies for radial-ply tires are prepared by coating individual reinforcing strands with a rubber composition, and winding the coated strands in a winding machine with relatively weak transverse circumferential strands into a continuous cylindrical tube in which the reinforcing strands are substantially parallel to the tube axis and circumferentially spaced, and are connected by the circumferential strands of weaker material. Axial sections are cut from the tube, and only the axially central, annular portion of each section is expanded radially during shaping of the carcass, thereby stretching or breaking the transverse, circumferential strands.

10 Claims, 18 Drawing Figures

METHOD OF PRODUCING A TIRE FOR A PNEUMATIC TIRE ARRANGEMENT

This application is a continuation-in-part of application Ser. No. 853,172 filed Nov. 21, 1977, now abandoned.

BACKGROUND OF THE INVENTION

The present invention relates to a method of producing a tire for a pneumatic tire arrangement. More particularly, the invention relates to a method wherein, in a first sequence of operating steps: an inner, tubeless-tire liner is optionally applied on a carcass drum; a carcass ply is thereafter superimposed on the carcass drum or on the liner; the carcass ply is then wrapped radially inwardly over the axial ends of the carcass drum; the bead cores are subsequently attached to the radially inwardly directed sections of the carcass ply; the radially inner edges of the radially inwardly directed sections of the carcass ply are then folded again over the bead cores in a radially outward direction and deposited on the cylindrical part of the carcass ply; and side strips and optional bead reinforcements and wedge strips are thereafter laid over the edges of the carcass ply so deposited and optionally over the cylindrical section of the carcass ply.

In a second sequence of operating steps, at least two belts are laid on a tread strip (or assembly) drum, and a tread strip is applied to these two belts. Additionally, the intermediate product resulting from the first sequence of operating steps, that is, the carcass, is transferred from the carcass drum to a shaping drum, and the intermediate product resulting from the second sequence of operating steps, that is, the tread strip package, is laid on the shaping drum over the axially central area of the carcass, in which thereafter the carcass is deformed into a torus by axially shortening the shaping drum and is thereby brought into engagement with the inner circumferential surface of the tread strip package. The rubber composition of the side strips and of the tread strip are brought into overlapping relationship and they are connected with each other, and ultimately the blank so produced is taken off the shaping drum and placed in a vulcanizing press.

In known methods of this type, the reinforcing fabric is prepared as a planar piece of fabric and wound about the carcass drum or the inner liner already superimposed on the drum. This causes overlapping and a poor degree of uniformity of the tire prepared results therefrom.

It is the object of the invention to avoid the impairment of the degree of uniformity caused by the design of the reinforcing carrier, and to provide the conditions for simplifying the manufacturing operation and for thereby reducing the manufacturing cost.

SUMMARY OF THE INVENTION

The basic idea of the invention resides in providing the carcass ply in the form of a fabric tube.

Briefly, the invention involves a method of preparing blanks for radial-ply tires having a predetermined bead core diameter comprising the steps of:

(a) coating individual, elongated, reinforcing members with a vulcanizable rubber composition;

(b) longitudinally moving the coated members in a common direction while circumferentially spaced about an axis extending in said direction;

(c) interconnecting the moving members by circumferentially extending deformable connecting means thereby forming a tube about said axis, said tube having a diameter substantially equal to said bead core diameter;

(d) severing said tube into axially consecutive sections; and (e) radially expanding the axially central portion of each section while substantially maintaining the diameter of the axially terminal portions of each section.

(f) said deformable connecting means in said axially central portion being circumferentially deformed during said step of radially expanding so that the circumferential distance of said reinforcing members is increased in said axially central portion.

The invention is also directed to apparatus for preparing blanks for radial-ply tires having a predetermined bead core diameter comprising:

(a) extruding means including a plurality of nozzles for separately extruding from each nozzle a strand of vulcanizable rubber composition;

(b) feeding means for feeding a plurality of elongated reinforcing members to said nozzles respectively for discharge from said nozzles of respective reinforcing members individually coated with said composition;

(c) winding means for receiving the coated reinforcing members from said extruding means and for interconnecting said members with transverse strands into a continuous, elongated, tubular structure having a longitudinal axis and a diameter substantially equal to said bead core diameter, said reinforcing members being elongated parallel to said axis, and said transverse strands connecting said members in said structure;

(d) severing means for axially severing a plurality of sections of said structure from each other; and (e) shaping means for radially expanding the axially central portion of each section while substantially maintaining the diameter of the axially terminal portions of each section.

With the present invention, the carcass ply tube may be produced in a production line associated with the carcass drum, and the leading end of the carcass ply tube is discharged from this production line and drawn directly from the production line over the carcass drum and thereafter cut to length.

The production line may start from the threads constituting the carcass ply, it may coat the threads in a multiple extruder with rubber composition, and then form the thus coated threads into a tube in a circular winding machine, it being essential that the threads providing strength be arranged longitudinally of the tube and thus being arranged on the carcass drum in the direction of drum length.

The term thread embraces textile threads and also stranded steel cord as employed for the carcass ply in the production of steel reinforced tires.

The rubber composition deposited on the threads is still sufficiently plastic in the completed carcass ply tube that the bead cores can be adhered to it by simply applying pressure.

It is customary in the initially described method to extrude or to calender the semi-finished products consisting of rubber composition, that is, the side strips, the tread strips and optionally the bead reinforcements, wedge strips, and liner strips in their ultimate, cross-sectional shape, and to apply them, cut to length, to the carcass drum or tread strip drum. For an explanation of the individual terms employed, it is to be noted that bead reinforcements are strips which are installed near the bead core for reinforcing the bead area; they are used particularly in heavy truck tires. Wedge strips are strips which are applied either on the carcass drum in the area intended for later engagement with the inner side of the tread strip package, or which are applied on the shaping drum to the previously toroidally deformed carcass in order to fill the wedge-shaped spaces between the toroidally deformed carcass and the tread strip package. Liner strips are strips which are deposited on the carcass drum over the reinforcing carrier fabric in the area intended for later engagement with the inner side of the tread strip package in order to provide a resilient cushion between the tread strip package and the carcass.

The known manner of producing the semi-finished products makes the manufacture of the tire difficult because different shrinkage of the individual strip sections must be considered even with a constant rubber composition so that manual compensation is necessary during applying of the strips, rendering automated tire production difficult or impossible.

Therefore, it is a further object of the invention to apply the semi-finished products in such a manner as to reduce to a minimum or entirely eliminate the previously necessary compensating work by human hands.

It is proposed according to the invention to achieve this object by applying the side strips and, optionally, the bead reinforcements and the wedge strips by winding a strip extruded directly at the location of the carcass drum in several juxtaposed and, optionally, superimposed turns on the rotating juxtaposed and, optionally, superimposed turns on the rotating carcass drum. It is also proposed that the tread strip be prepared in an analogous manner from a strip extruded directly at the location of the tread strip drum by depositing this extruded strip in several turns side by side or, optionally, one over the other.

In applying the semi-finished products according to the invention, it is necessary that the semi-finished products be shaped on the carcass drum and on the tread strip drum. For such shaping, it is proposed that the side strips and, optionally, the bead reinforcement and the wedge strips, be shaped after application of the extruded, wound strip by at least one shaping roller whose movement is controlled in two directions, that is, both axially of the carcass drum as well as radially toward and away from the carcass drum, the axial width of the roller being smaller than the axial width of the finished side strip or bead reinforcement or wedge strip.

The same applies for the tread strip, that is, it is further proposed that the tread strip be shaped by a shaping roller whose movement is controlled in two directions, both axially of the tread strip drum as well as radially toward and away from the drum.

The combination of the measures proposed according to the invention permits for the first time a fully reproducible cycle of tire manufacture and thereby automatic production control.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 1:
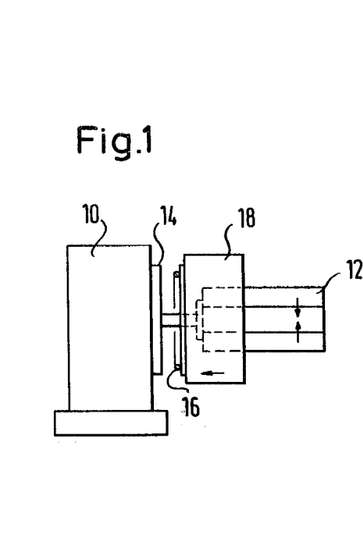
FIG. 1 shows a carcass drum arrangement with a device for introducing a first bead core in the ready condition.
Figure 1A:
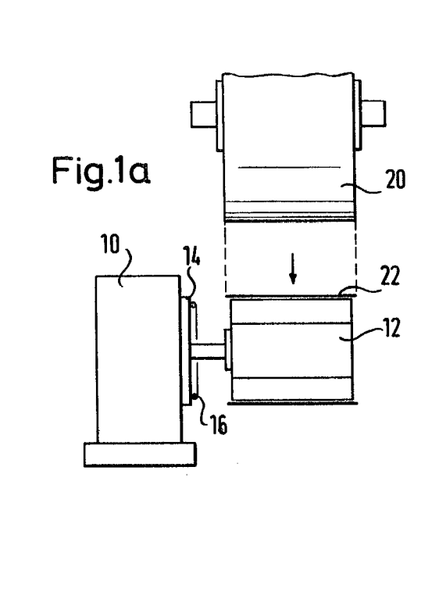
FIG. 1a shows the carcass drum with a device for applying an inner liner.

Referring now to the drawings and particularly to FIG. 1 a bearing pedestal 10 has a carcass drum 12 mounted thereon for rotation by means of a rotary drive. A core setting device 14 arranged on the bearing pedestal 10 is in the process of having a core 16 fed thereto by a core supplying device 18. As shown in FIG. 1a, the core 16 is already transferred to the core setting device 14 and it is being held there in the ready position. There is further seen in FIG. 1a a feeding drum 20 for supplying liner material 22 which is wound during rotation of the carcass drum 12 on the radially expanded carcass drum and cut to length after winding. With reference to FIG. 1, it is to be added that the carcass drum there is radially contracted to permit clearing by the core feeding device.

Figure 1B:
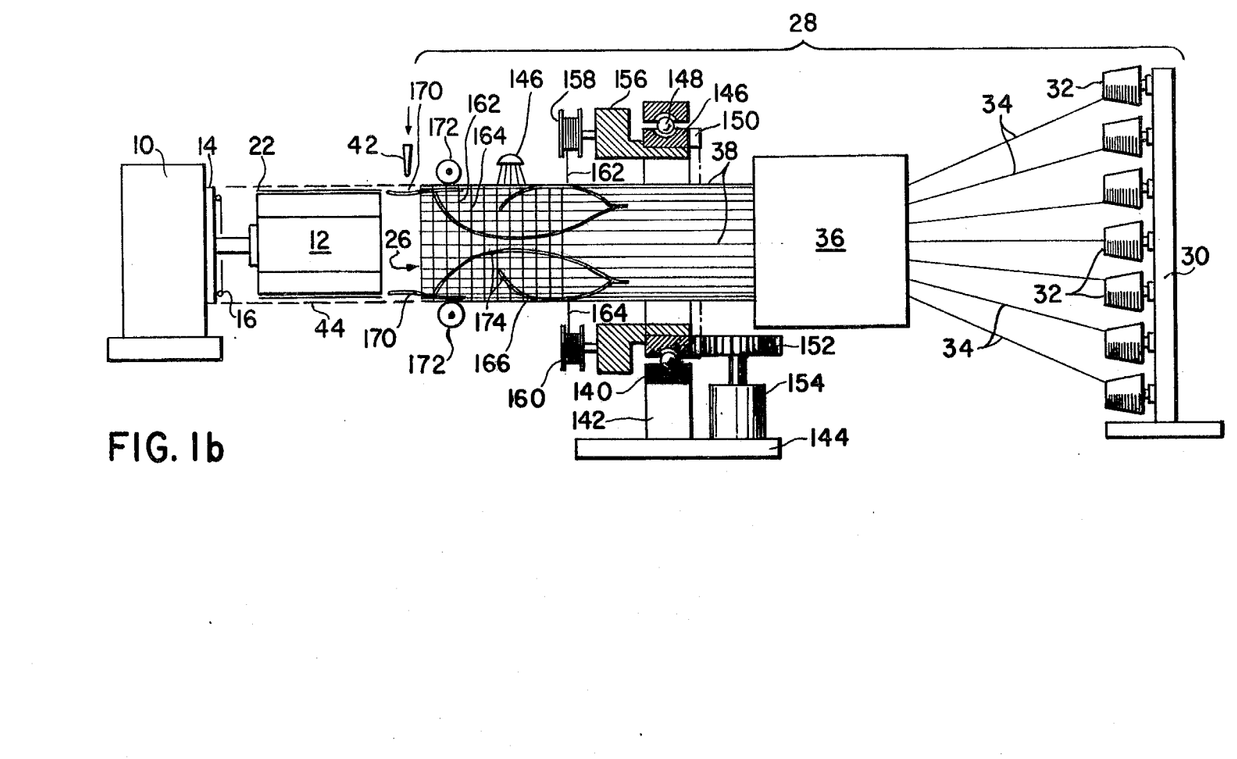
FIG. 1b illustrates the carcass drum arrangement with a production line for preparing and applying a carcass ply tube.

FIG. 1b, depicts the facility for forming the tubular carcass ply and for placing the carcass ply upon the carcass drum 12 carrying the liner 22.

A tube 26 is produced in a production line 28. The production line 28 includes a spool rack 30 carrying a multiplicity of thread spools 32. Reinforcing threads 34 pass from the thread spools 32 through a multiple extruding device 36 in which the treads are covered with a plastically deformable vulcanizable rubber composition.

The covered threads 38 pass through relatively simple textile machinery wherein the fabric or carcass ply tube 26 is formed. As will be seen from FIG. 1b, this machinery provides peripheral or circumferential threads which are spirally wound around the incoming tubular arrangement of the coated threads 38.

A stationary ring 140 mounted upon a foot or base 142 on a mounting plate 144 has a concentric inner ring 146 rotatably mounted thereon by bearing means which include balls 148.

On the right front side of the inner ring 146 there is provided an annular rack 150 which is in engagement with a driving pinion 152. The driving pinion 152 is driven by an electric motor 154 and operates to rotate the inner ring 146 within the outer stationary ring 140. The inner and the outer rings 146 and 140 are in concentric arrangement with the circular arrangement of threads 38 which are arriving from the coating unit 36. On the rotating inner ring 146 there is mounted a rotating spool carrier 156 which rotates with the inner ring 146. On the spool carrier 156 there are rotatably mounted two or a plurality of spools 158, 160. These spools each bear a thread 162 and 164, respectively. The threads 162 and 164 coming from the spools 158 and 160 are spirally wound around the circular arrangement of longitudinal threads 38. The spools 158 and 160 may be slightly braked so that the threads 162 and 164 are wound with a slight tension around the circular arrangement of the longitudinal threads 38. An inner core 166 may be provided in the area in which the threads 162 and 164 are wound on the circular arrangement of the longitudinal threads 38, which inner core may be supported from the unit 36. At the axial position, in which the threads 162 and 164 are wound around the circular arrangement of the longitudinal threads 38 the coating mass which has been coated on the longitudinal threads 38 in the unit 36 is still tacky so that the threads 162 and 164 are adhesively bonded to the longitudinal threads 38 and thereby a tubular construction is made.

Figure 3:
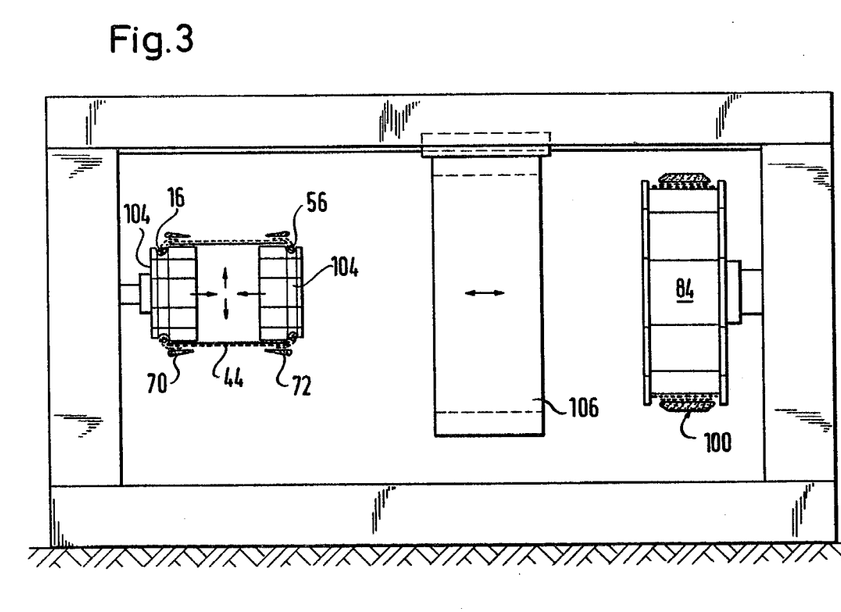
FIG. 3 illustrates an assembly machine consisting of shaping drum, a tread strip drum, and a transfer ring.
Figure 3A:
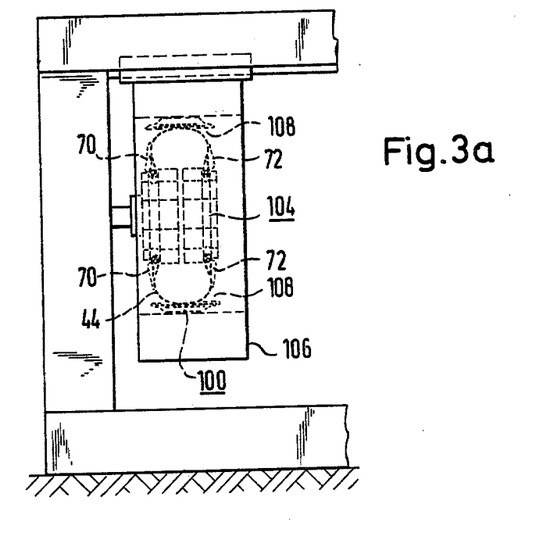
FIG. 3a is a partial view of the assembly machine with the shaping drum, the carcass already being deformed toroidally.

The threads 162 and 164 are either of elastomeric material like rubber or they are slightly breakable cotton threads spun from a short fiber material. When the tubular material illustrated in FIG. 1b is radially expanded as shown in FIG. 3a, rubber threads will be elastically stretched whereas if cotton threads are used they will be broken, so that they allow the longitudinal threads 38 to increase their circular distance in the axially central portion of the carcasses.

In an alternative method, the coated longitudinal threads 38 are brought, after the coating step, in circumferential contact so that they are adhesively bonded together by the coating material which is still tacky. This coating material may comprise deformable connecting means which will permit the tube to be deformed is described above without the use of circumferential threads 162, 164.

The tubular material made in FIG. 1b may be brought to the carcass drum 12 by being drawn by a conventional winding-up mechanism by which the tubular material is flattened and later drawn from the winding-up mechanism, cut into pieces corresponding to the length of the carcass, re-opened from the flat form into the circular form and brought by hand onto the carcass drum 12.

Alternatively, the tube made from the longitudinal threads 38 and the circumferential threads 162, 164 may be guided around a further tubular guiding member 170 by withdrawing rollers 172, which are in frictional engagement with the tube. The annular guiding member 170 may be mounted to the coating unit 36 by supporting members 174. The tube is of such stiffness that it is conveyed by rollers 172 onto the carcass drum 12, and will traverse the necessary gap between the guiding member 170 and the carcass drum 12. The unit 10 may be shiftable in a direction perpendicular to the plane of the drawing in FIG. 1b, so that after a carcass has been pushed onto the carcass drum 12 a further unit 10 with a further carcass drum 12 may be brought into alignment with the guiding member 170.

The alignment of the leading edge of the tube after severing with the new carcass drum may be assisted by hand. An infrared radiator 176 may be provided after the section in which the circular threads 162, 164 have been applied to the longitudinal threads 38. By this infrared radiator, which is to extend around the total tube, the coating mass on the longitudinal threads may be cured after the application of the circumferential threads 162, 164.

Figure 1C:
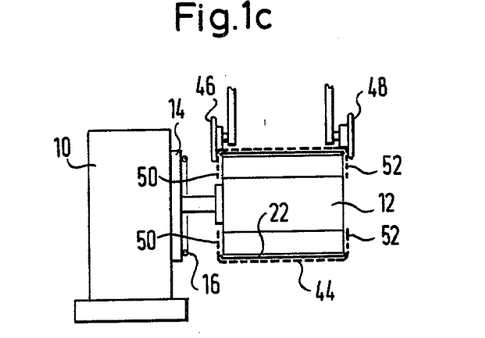
FIG. 1c shows the carcass drum arrangement with devices for radially inward folding of the ends of the carcass ply tube.

In FIG. 1c, there is shown a folding device at the carcass drum 12, the device being constituted by two folding rolls 46, 48 which have just folded the projecting ends 50, 52 of the tube section 44 in a radially inward direction and laid them against the frontal surfaces of the carcass drum 12. The plasticity of the thread covers in the fabric tube permits the radially inwardly folded ends to maintain this position at first.

Figure 1D:
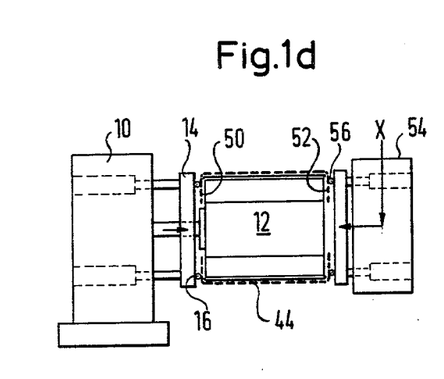
FIG. 1d shows the carcass drum arrangement with devices for applying the bead cores.

In FIG. 1d, the bead cores, namely the aforementioned bead core 16 and the opposite bead core 56 are set by means of two core setting devices, the previously mentioned core setting device 14 and a further core setting device 54. The core setting device 54 is not fixedly assembled with the revolving head arrangement 10, but is movable relative thereto at right angles to the drum axis in the direction of an arrow so that this core setting device and the bead core 56 held therein may be aligned with the carcass drum 12. The bead cores 16, 56 are simply pressed against the folded-over sections 50, 52 of the fabric tube, and remain stuck there because of the plasticity of the rubber composition enveloping the fabric threads.

Figure 1E:
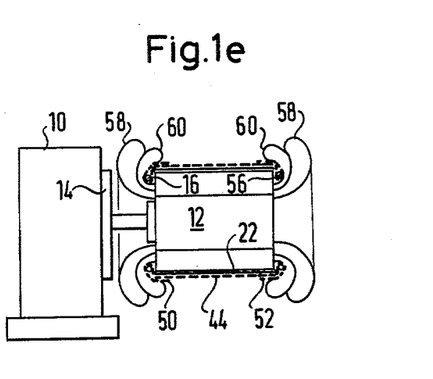
FIG. 1e shows the carcass drum arrangement with devices for wrapping the radially inner ends of the carcass ply tube over the bead cores.

FIG. 1e shows the radially innermost sections of the radially inwardly folded tube ends 50, 52 being turned again in a radially outward direction and laid against the drum circumference. This is done by means of pneumatically expandable rubber bellows 58, 60 which are arranged within the carcass drum 12 and are deformed during inflating as shown in FIG. 1e. Details of this type of turning device are known per se.

Figure 1F:
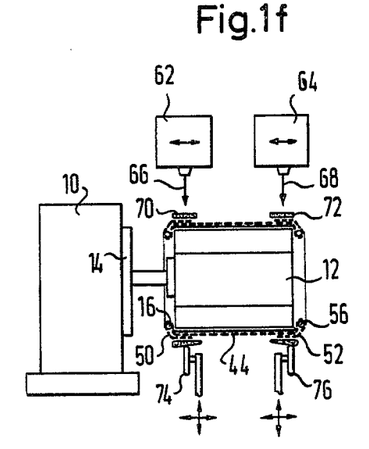
FIG. 1f illustrates the carcass drum arrangement with extruders for extruding and applying extruded strips constituting the side strips and with shaping rollers for shaping the side strips.

The carcass drum arrangement 10 with carcass drum 12 is again shown in FIG. 1f. Two extruders 62, 64 were now brought into operating position opposite the carcass drum. These extruders extrude respective extruded strips 66, 68 onto the rotating carcass drum 12 so that the extruded strips 66, 68 are wound on the carcass drum to form side strips 70, 72, in juxtaposed and, optionally, superimposed relationship due to lateral advance of the extruders 62, 64. The tread strips 70, 72 extend over the axially inwardly directed ends of the turned-over ends of the fabric tube, and beyond the same.

There are further shown in FIG. 1f shaping rollers 64, 76 which are intended to impart the desired cross-sectional shape to the side strips 70, 72 which are applied in their as-extruded shape. The shaping rollers 74, 76 are controlled for lateral feeding movement and for radial movement toward and away from the drum 12. The carcass is completed after shaping of the side strips 70, 72 unless bead reinforcements and/or wedge strips are applied. If bead reinforcements or wedge strips are applied, this is done in the same manner, that is, with the aid of special extruders and of corresponding shaping rollers.

Figure 1G:
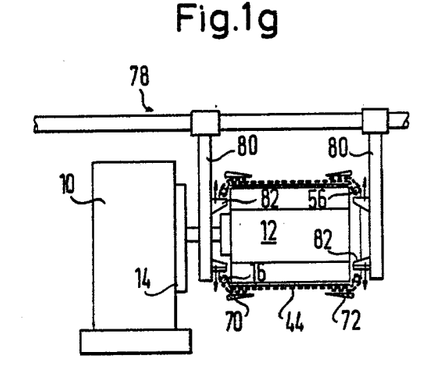
FIG. 1g shows the carcass drum arrangement with a transfer device for transferring the completed carcass to a shaping drum.
Figure 1H:
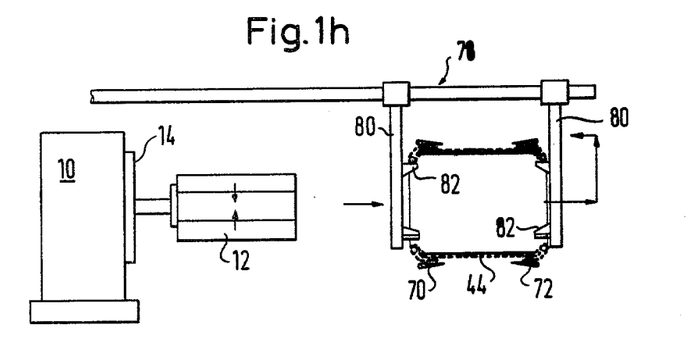
FIG. 1h shows the carcass drum arrangement with the carcass removed from the carcass drum.

As shown in FIG. 1g, a transfer device 78 has entered a position of readiness opposite the carcass drum 12. This transfer device 78 includes two gripper arms 80 with grippers mounted thereon. The grippers 82 are movable in a radial direction and engage the radially inner edges of the carcasses, that is, below the beads. As soon as engagement of the beads by the grippers 82 is accomplished, the carcass drum 12 is contracted from the radially expanded position according to FIG. 1d to the radially contracted position according to FIG. 1h so that the completed carcass may now be removed from the carcass drum.

Figures 2, 2A:
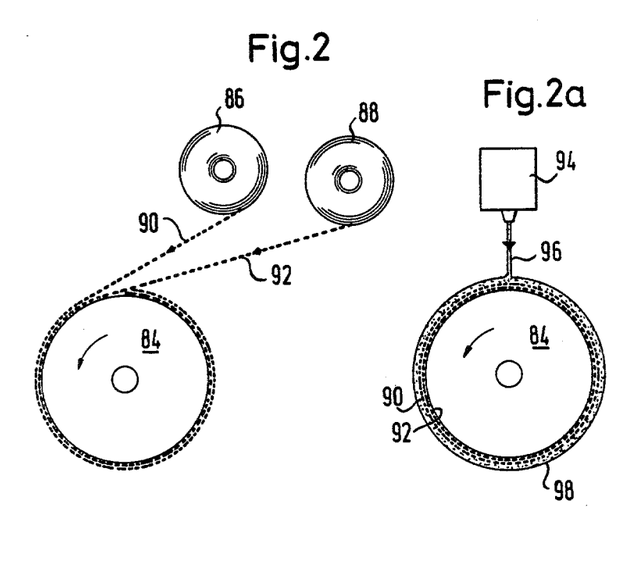
FIG. 2 shows a tread strip drum with feeding devices for supplying belts.
FIGS. 2a and 2b show the carcass drum with an extruder for extruding and applying the tread strip material to the belts in two different views.
Figure 2B:
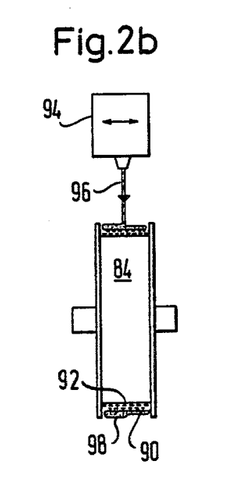
Figure 2C:
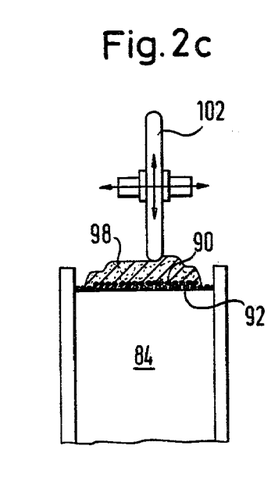
FIG. 2c illustrates a shaping device for shaping the tread strip material on the tread strip drum.

The preparation of the tread strip is illustrated in FIGS. 2a–2c. A tread strip drum 84 is seen in FIG. 2. Two belts 90, 92 coming from two supply stations 86, 88 are wound on this tread strip drum. The belts consist of steel cord fabric coated with rubber composition. One layer of each belt 90, 92 is wound on the tread strip drum 84.

Figure 2D:
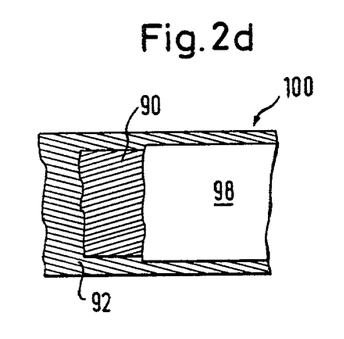
FIG. 2d is a top plan view of a belt package partly broken away.

As is seen in FIGS. 2a and 2b, an extruder 94 applies an extruded strip 96 over the belts. The extruder again is laterally adjustable so that turns of the extruded strip are wound on the rotating tread strip drum side by side to constitute the tread strip. The tread strip is designated 98. The assembly of the two belts 90, 92 and of the tread strip 98 is referred to as tread strip package. FIG. 2d shows the partly broken open tread strip package 100 including the two belts 90, 92, and the tread strip 98.

A shaping roller 102 is provided in FIG. 2c and is adjustable in the direction of the axis of the tread-strip drum 84 and radially movable relative to the drum, the axial and radial movements being controlled by a program device in proper coordination. The tread strip package is completed by the operating step illustrated in FIG. 2c and is combined thereafter with the also completed carcass to a tire blank. This combining is carried out in the assembling machine according to FIG. 3.

In FIG. 3, there is again seen the completed carcass which was transferred to shaping drum 104 by the transfer device 78. There is further seen the tread strip drum 84 with the completed tread strip package 100. Another transfer device 106 is located between the shaping drum 104 and the tread strip drum 84 and is arranged in such a manner that it may move axially over the tread strip drum 84 and grip the completed tread strip package, for example, by means of suction grips. The transfer device 106 takes the completed tread strip package over the shaping drum 104 into the position shown in FIG. 3a.

The shaping drum 104 is designed in such a manner that it can engage the beads of the carcass in order thereafter to move the beads together for expanding the axially central portion of the carcass while maintaining the diameter of the axially terminal portions attached to the beads. It is evident from comparison of FIGS. 3 and 3a that the two halves of the shaping drum which were spaced in FIG. 3 corresponding to the stretched carcass are moved together in FIG. 3a with simultaneous shaping of the carcass. Because of the shaping of the carcass in FIG. 3a, the external circumference of the carcass has come into contact with the inner surface of the tread strip package 100. Wedge strips may be placed into the wedge-shaped spaces 108 between the tread strip package 100 and the carcass. This may be done either on the carcass drum 12 or on the shaping drum before the tread strip package 100 is placed over the shaping drum.

Figure 3B:
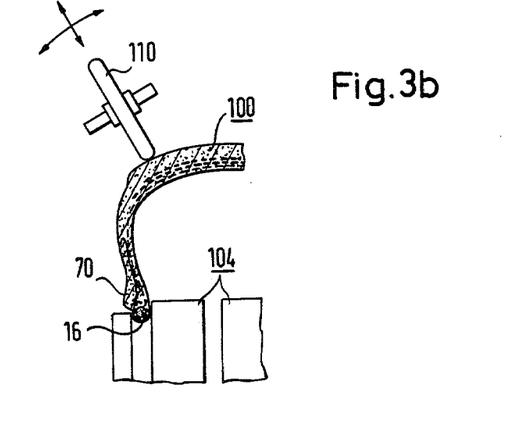
FIG. 3b illustrates a shaping device at the shaping drum for connecting the tread strip with the side strips.

FIG. 3b shows how the rubber compositions of the tread strip package 100 and the side strip 70 are connected with each other after shaping by means of a shaping roller 110 so that the completed tire blank is formed. These tire blanks may then be introduced into the vulcanizing press in a known manner.

Figure 4:
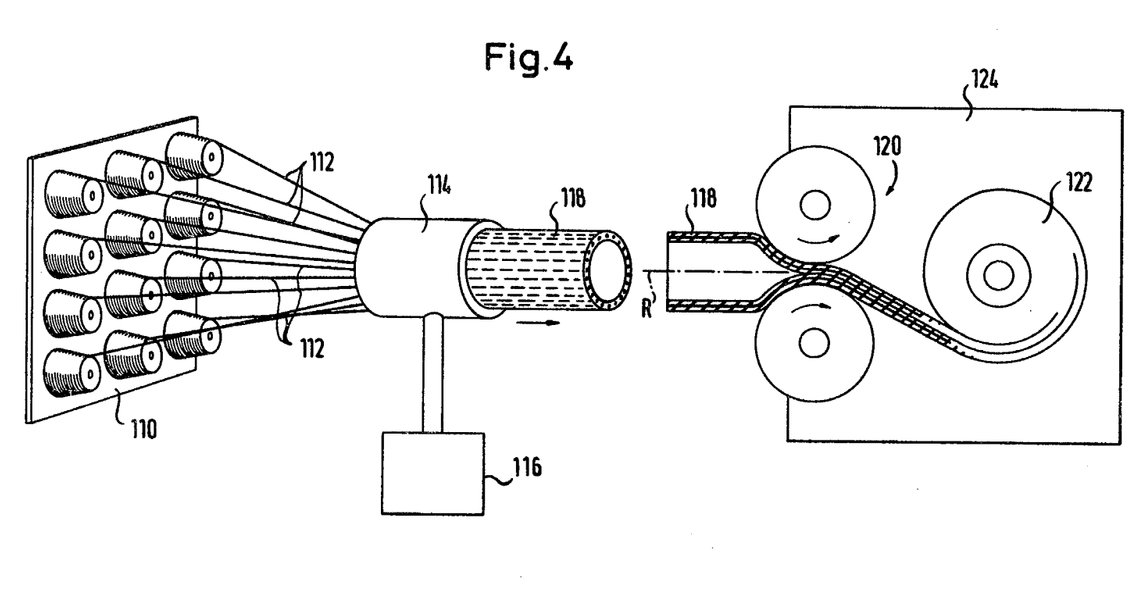
FIG. 4 shows apparatus for preparing the belt material.

According to FIG. 2d, the tread strip package includes two belts 90, 92 which may be prepared individually in a conventional manner. The invention further encompasses a novel production of the belts in continuous form in a single operating step. For further explanation, FIG. 4 is to be noted. FIG. 4 shows a spool rack 110 from which stranded steel cords 112 may be drawn. The stranded steel cords are covered with a plastically deformable rubber composition in a multiple-extruder head 114 which is fed from a multiple extruder 116 so that a tube, designated 118 in FIG. 4 and consisting of stranded steel cords individually coated with mixture is discharged from the multiple extruder head 114. This tube 118 passes between a pair of pinch rolls 120 and is then wound on a take-up reel 122. The pair of pinch rolls 120 and the wind-up reel 122 are mounted on a rotor 124 which is rotatable about an axis R and driven. Because of the rotary movement of the rotor 124, the tube 118 is twisted already before entering the pair of pinch rolls 120. When the tube is laid flat by the pair of pinch rolls 120, the individual, stranded steel cords therefore define acute angles with the drawing direction, and the stranded cords are arranged in the layers formed by flattening under pressure approximately as shown in FIG. 2, the stranded cords of the two layers of the flattened, dual-layered structure being connected at the edges in an obvious manner.

It has been found that the use of such a composite double belt is advantageous as compared to the use of individual belts according to FIG. 2d because the risk of the belt edges unraveling is reduced thereby.

While specific embodiments of the invention have been shown and described in detail to illustrate the application of the inventive principles, it will be understood that the invention may be embodied otherwise without departing from such principles.

What is claimed is:

1. A method of preparing blanks for radial-ply tires having a predetermined bead core diameter comprising the steps of:
   (a) extrusion coating individual, elongated, reinforcing members aligned in a tubular array with a vulcanizable rubber composition;
   (b) longitudinally moving the coated members aligned in a tubular array in a common direction while circumferentially spaced about an axis extending in said direction;
   (c) interconnecting the moving members by circumferentially extending deformable connecting means, thereby forming a tube about said axis, said tube having a diameter substantially equal to said bead core diameter;

(d) severing said tube into axially consecutive sections;

(e) mounting the tube sections on a building drum;

(f) incorporating bead rings into the axial terminal portions of said sections; and (g) radially expanding the axially central portion of each section while substantially maintaining the diameter of the axially terminal portions of each section, so as to form a toroidally shaped tire blank;

(h) said deformable connecting means in said axially central portion being circumferentially deformed during said step of radially expanding so that the circumferential distance of said reinforcing members is increased in said axially central portion.

2. Apparatus for preparing blanks for radial-ply tires having a predetermined bead core diameter comprising:

(a) extruding means including a plurality of nozzles for separately extruding from each nozzle a strand of vulcanizable rubber composition, said nozzles being arranged to extrude a plurality of said strands in a tubular array in a common direction and circumferentially spaced about an axis extending in said direction;

(b) feeding means for feeding a plurality of elongated reinforcing members to said nozzles respectively for discharge from said nozzles of respective reinforcing members individually coated with said composition;

(c) textile machinery means for receiving the coated reinforcing members in said tubular array from said extruding means and for interconnecting said members into a continuous elongated tubular structure having a longitudinal axis and a diameter substantially equal to said bead core diameter, said reinforcing members being elongated parallel to said longitudinal axis, said textile machinery means including means for applying circumferentially extending deformable connecting strands about said coated reinforcing members thereby to form said tubular structure;

(d) severing means for axially severing a plurality of sections of said structure from each other;

(e) means for mounting sections of said structure on a building drum;

(f) means for incorporating bead rings into axially terminal portions of said sections;

(g) shaping means for radially expanding the axially central portion of each section while substantially maintaining the diameter of the axially terminal portions of each section so as to form therefrom a toroidally shaped tire blank;

(h) said shaping means operating to circumferentially deform said deformable connecting means in said axially central portion during said step of radially expanding so that the circumferential distance of said reinforcing members is increased in said axially central portion.

3. A method according to claim 1 wherein said circumferentially extending deformable connecting means comprise thread members wound circumferentially about said reinforcing members.

4. A method according to claim 3 wherein said thread members comprise elastically deformable members.

5. A method according to claim 4 wherein said elastically deformable members are formed of an elastomeric composition.

6. A method according to claim 3 wherein said thread members comprise breakable cotton threads spun from a short fiber material.

7. A method according to claim 6 wherein said cotton threads are ruptured during said step of radially expanding.

8. A method according to claim 3 wherein said thread members are wound around said reinforcing members in a spiral pattern.

9. Apparatus according to claim 2 wherein said textile machinery means comprise:

a fixed outer ring extending circumferentially around said tubular structure;

an inner ring concentric with said outer ring rotatably mounted thereon;

transverse strand feeding means mounted on said inner ring for rotation therewith about said tubular structure; and means for rotatively driving said inner ring.

10. Apparatus according to claim 9 wherein said transverse strand feeding means comprise a plurality of spools from which said transverse strands unwind during rotation of said inner ring.

* * * * *